Nov. 16, 1954  F. O. HESS ET AL  2,694,246
METAL HEATING APPARATUS
Filed March 15, 1950  6 Sheets-Sheet 5

FIG. 7

INVENTOR.
*Frederic O. Hess*
*Alfons A. Furczyk*
*William E. Gildersleeve*
By *E. Wolford Mason*
ATTORNEY.

Nov. 16, 1954  F. O. HESS ET AL  2,694,246
METAL HEATING APPARATUS
Filed March 15, 1950  6 Sheets-Sheet 6

FIG. 8

INVENTOR.
Frederic O. Hess
Alfons A. Furczyk
William E. Gildersleeve
By E. Willford Mason
ATTORNEY.

United States Patent Office 2,694,246
Patented Nov. 16, 1954

2,694,246

METAL HEATING APPARATUS

Frederic O. Hess, Alfons A. Furczyk, and William E. Gildersleeve, Philadelphia, Pa., assignors to Selas Corporation of America, Philadelphia, Pa., a corporation of Pennsylvania Application March 15, 1950, Serial No. 149,808

18 Claims. (Cl. 29—69)

The present invention relates to the continuous heating of elongated objects such as billets, and more particularly to a system for handling elongated articles from the time they are removed from a stockpile, through the heating thereof to the time they are delivered to mechanism by which subsequent work is done upon them.

The present invention will be described in connection with the heating of billets in preparation for feeding them to a piercing mill where they are made into seamless tubes. It will be apparent, however, that the objects being heated may be tubes or other shapes, and that they can be used in other processes than piercing.

It has been the custom in heating billets for piercing to put a number of them in a furnace for heating. As the billets were needed they were removed one by one and sent to the piercing mill. In working in this fashion the billets are not heated to exactly the same temperature, and they become covered with scale. Such billets often require descaling or other treatment before they can be pierced. More important, however, is that the non-uniformly heated billets produce non-uniform tubing. This difficulty can be traced directly to the heating process.

With the system of the present invention each billet is treated exactly like each other billet so that they are uniformly heated as they are delivered to the piercing mill. In accordance with the present invention billets are supplied from a stock pile to a charging table. This table serves to deliver the billets in the proper sequence in pairs to a dual furnace line. Each furnace line has a pair of billets passing through it at a predetermined speed, with one pair immediately following another so that the supply in each furnace line is continuous.

As the pair of billets in each furnace line reaches the discharge end thereof, the billets are advanced rapidly one at a time, cut to length, and returned to the furnace line to be maintained at temperature. The cut off end of the billet is moved by a discharge mechanism to the piercing mill. Arrangements are provided so that the billets in the various rows are cut one after another, thereby keeping all of the lines in substantially continuous movement. Suitable controls are provided to insure that the billets are handled in the proper sequence by the discharge mechanism, and that the unused length of billet returned to the heating line will not interfere with the billets following.

Suitable control means is provided for the units of each furnace line in order to insure that the individual billets are rapidly heated to the proper temperature as they are moving from one end to the other of the line. Incorporated in the control system is a means responsive to billet temperature which will cause the entire line to oscillate, and thereby increase the time the billets are in the furnace, if any billet is not up to the proper temperature.

It is an object of the invention to provide mechanism for supplying elongated work pieces from a single source of supply, divide them into a plurality of groups, and heat them individually one after another to the desired temperature. It is a further object of the invention to take the work pieces one at a time, in sequence, from the various groups, cut them to length, and supply them to a point of use. That portion of the work piece which is not used is returned to the furnace, where it is kept at temperature, until it is again advanced in the normal sequence.

It is a further object of the invention to provide a system in which a plurality of work pieces are heated at the same time with means to insure that they are each brought up to the same temperature. It is another object of the invention to provide a system for heating work that may be so adjusted that each billet is treated individually.

It is a further object of the invention to take work pieces from a single source of supply, divide them into a plurality of groups, heat and perform work on them, return them to a single line in orderly sequence, and supply them to a location in which they may be used or have further work performed upon them. The system is so arranged that the same time elapses between removing each work piece from the place in which it is heated until it is delivered to the point of use.

The invention, together with the objects and advantages thereof will be more fully understood upon reference to the following description taken in conjunction with the accompanying drawings forming a part of this specification, and of which.

The apparatus of the present invention consists of a supply section, a heating section, a feeding and holding section and a discharge section. These sections take the billets from a stock pile and supply them to the heating furnace in the proper sequence where they are heated. From there they are fed one at a time to a saw where they are cut to length and to a discharge table that moves the cut length of billet to the point of use, which for purposes of description herein is a piercing mill. The uncut length of the billet is returned to the feeding and holding section of the furnace to maintain it at temperature until in the sequence of operation of the system it is again to be advanced for cutting. The various sections of the apparatus act jointly to perform their respective functions on the billets, and are tied together by interlock controls. For purposes of this description the various sections will be described one at a time in the order in which they act on the billets. This will be followed by an overall summary of the operation.

Figure 1A:
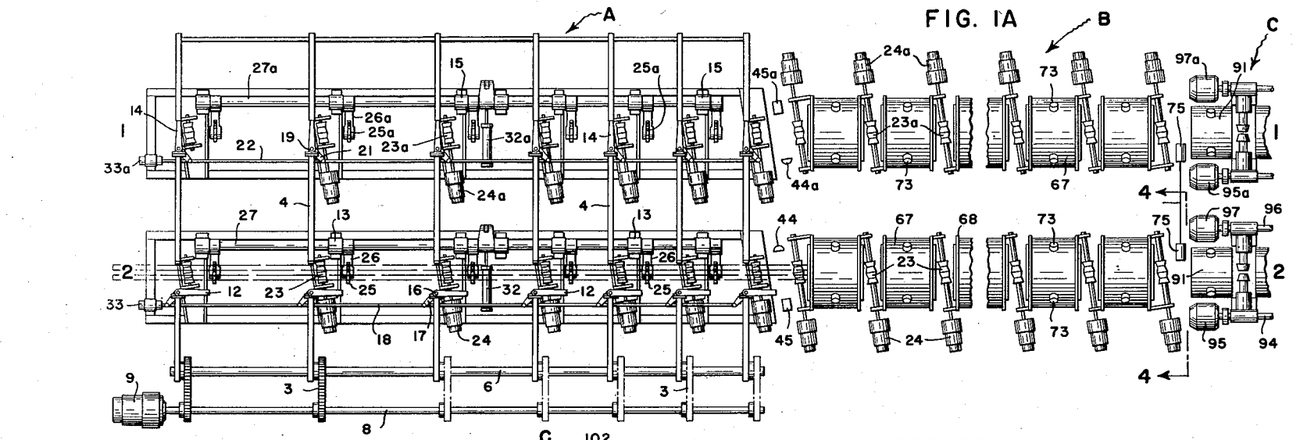
Figures 1A and 1B show a plan view of the entire system.
Figure 1B:
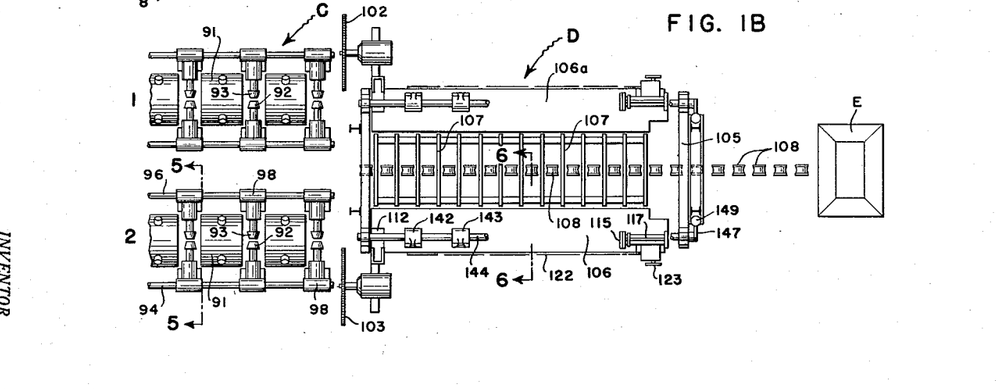

Referring first to Figures 1A and 1B, the billets are moved to supply section A where they are supplied in the proper sequence to two parallel furnaces in the heating section B. From the heating section the billets move to a holding and feeding section C and to a discharge section D from which they are fed in cut lengths and are fed one at a time to a piercing mill E.

The supply section is shown in Figures 1A, 1B, 2 and 3. Billets or other work W are moved from a point of supply to a position to be fed to furnace lines 1 and 2 by a series of conveyor chains 3 to an inclined table 4 comprising a series of parallel supports extending perpendicularly to the heating lines. The upper ends of the chains 3 move over idler pulleys 5 that are attached to a shaft 6 extending the length of the supply table. The lower ends of these chains pass around sprockets 7 that are attached to a shaft 8 driven by a suitable motor 9. Each chain has projections 11 extending from it upon which the billets are placed so that they will be lifted from the lower supply to the upper end of the inclined table 4. As the billets roll down the inclined table they pass over a gate 12 and at times are stopped in a position on the gate by means of a series of stops 13. If the stop 13 is not in its active position the billets will continue to roll down the table 4 until they are over a second series of gates 14. The billets are stopped in position above the gates 14 by a series of stops 15. The gates 12 are mounted for movement around hinges 16, and each gate is provided with a rearwardly extending arm 17 with all of the arms being connected by a common actuating rod 18. In a like manner, each of the gates 14 is mounted on a hinge 19. These gates likewise have arms 21 that are connected to a common actuating rod 22. The gates 12 and 14 are both shown as being closed in Figure 2, but the gates 12 are disclosed in Figure 1A as being open. In this case the rod 18 is moved to the left in that figure thereby moving the gates to the position shown in Figure 1A so that the billets placed on these gates can be removed.

As was mentioned above, there are two elongated furnaces to which the billets in furnace lines 1 and 2 are supplied. As best shown in Figure 1A, the entrances of each of the furnaces are axially aligned with a series of conveyor rolls that are located directly below the gates. The conveyor rolls below gates 12 are indicated at 23 and are driven individually by suitable motors 24. The billets are lowered from a position on the gates 12 to a position shown in section in Figure 2, wherein the billets are placed on the conveyor rolls, by means of an elevator mechanism that includes a carrier 25. This carrier is mounted on an arm 26 that is in turn attached to a shaft 27 extending the length of the supply table. Normally speaking, there are provided a number of carriers 25 and arms 26 equal to the number of gates and rails 4 forming the table. The carriers 25 are prevented from moving around their pivots on the outer ends of arms 26 by means of a parallel linkage including the links 28 that are connected at one end with the lower end of the carriers and are pivoted at 29 to the frame directly below shaft 27. The carriers are moved from the position shown in Figure 2 to a position in which they will support billets on gate 12 by hydraulic means including a piston rod 31 having a piston on its outer end that is received in a cylinder 32. The left end of piston rod 31 is connected to shaft 27 by an arm 30. Thus when fluid is admitted to the left end of the cylinders in Figure 2, rod 31 will be moved to the right to raise the carriers from the position shown therein to a position in which they can support billets which are placed as shown in the dotted lines on gates 12. Billets are lowered from gate 14 to similar conveyor rolls by mechanism similar to that described above. The conveyor rolls and the lifting mechanism associated with the gates 14 are given the same reference numerals as the parts previously described except that the letter *a* has been added to the reference numeral. It is noted that each of the conveyor rolls 23 and 23a is provided with a pair of grooves of the conveyor rolls. As it will be pointed more fully hereinafter, two billets are supplied simultaneously to each of the furnace lines 1 and 2.

It will be seen from Figure 1A that each of the rails 4 of the supply table is provided with a gate 12 and a gate 14. Between each of the rails 4 is located one of the stops 13 and 15 as well as one of the elevating mechanisms 25 and 25a. Corresponding parts in and between each of the rails are operated in unison regardless of the initial length of the billet being handled.

Figure 3:
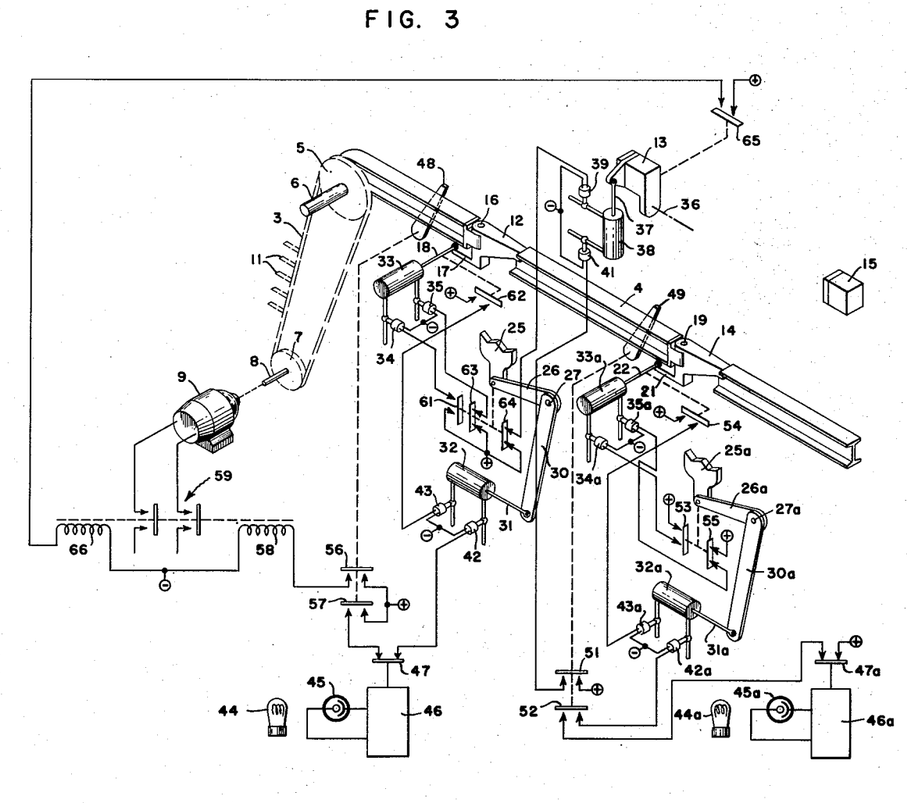
Figure 3 is a perspective view of the supply mechanism and the operating mechanism therefor.

In Figure 3 there is shown a diagrammatic perspective view of the operating parts of the supply section. In addition to those parts that have already been described, actuating means for various of the movable parts are shown more or less diagrammatically in that figure. It will be seen that the connecting rod 18 extending between gates 12 is connected to a piston received in a hydraulic cylinder 33. Fluid can be admitted to the lower end of the cylinder through solenoid valve 34 to move the rod 18 in a direction to open the gates, and through a solenoid valve 35 to move the rod in a direction to close the gates. Similar parts are used to open and close the gates 14 through which billets are supplied to the furnace line 1.

As is shown diagrammatically, the stops 13 between gates 12 and 14 are pivoted around a shaft 36 so that they may be moved out of the way when necessary. To this end the stop has an arm extending therefrom that is connected to a piston rod 37 which has a piston on its end received in a cylinder 38. Fluid can be admitted to the upper end of the cylinder through a solenoid valve 39 to move the stop around shaft 36 out of blocking position. The stop is moved back in blocking position when fluid is admitted to the bottom of the cylinder through a solenoid valve 41.

The carriers 25 and 25a are raised and lowered by the admission of actuating fluid to one end or the other of their respective actuating cylinders 32 and 32a. Member 25 is raised to its upper position by the admission of fluid to the right end of cylinder 32 through a solenoid valve 42 and is lowered by the admission of fluid to the other end of the cylinder through a suitable solenoid valve. Similar valves are provided for cylinder 32a. Any suitable and well-known means may be used to control the flow of fluid from one end of the fluid cylinders when it is being admitted under pressure to the other end. Such means is well-known in the art and has been omitted here for the sake of clearness.

From time to time it may be that billets lowered by the carriers and placed upon the conveyor rolls 23 or 23a have not been moved into the furnace by the time other billets have been placed upon the gates 12 or 14 ready to be lowered. Means responsive to the passage of the billets into the furnace is therefore provided to dominate the operation of the elevating mechanism. To this end a light 44 shining on a photocell 45 is provided immediately in front of the entrance to the furnace of line 2. If billets are moving into the furnace, light to the photocell will be cut off so that an amplifier and relay 46 will be de-energized and a switch 47 controlled thereby will be open. On the other hand if no billets are passing into the furnace the relay will be energized and the switch 47 closed. Similar provisions are made for furnace line 1.

In the operation of the supply mechanism billets are moved by the conveyor chains 3 to the upper ends of rails 4, from which they roll down toward the gates 12 and 14. Located in the path of the billets is a first counter actuating member 48 and, beyond gate 13, a second counter actuating member 49, that are shown diagrammatically herein as switch actuating levers. Each of the furnace lines is designed to heat two billets at a time, so that member 49 is adjusted to close its contacts when two billets have moved past it and member 48 is adjusted to close its contacts when four billets have moved past it.

Assuming that the chain is operating, the first billet supplied to the rails 4 will roll down against stop 15 and be positioned on the gates 14. When the second billet has rolled down against the first, member 49 will be operated to close the switches 51 and 52. Closure of switch 51 will energize solenoid valve 41 to open the same so that fluid can be supplied to the lower end of cylinder 38, thereby raising stop 13 into the position shown in which it will stop further billets that are supplied by the chain in a position over gates 12. Closure of switch 52, assuming that switch 47a is closed indicating that no billets are on the conveyor rolls beneath gates 14, will energize solenoid valve 42a. This valve is, therefore, opened to permit fluid to flow into the right end of cylinder 32a. This operation will raise the carriers 25a upwardly until they support the billets that are on gates 14. When carriers 25a have reached the upper limit of their movement, a switch arm actuated in response thereto will move bridge 53 to a position where contacts engaged thereby are closed. Closure of these contacts will energize solenoid valve 34a to open that valve so that fluid may flow to the left end of cylinder 33a. As this takes place the connecting rod 22 will be moved to move gates 14 to an open position. When the gates have opened to a position such as is shown by gates 12 in Figure 1A, and entirely away from the billets that were on them, a switch 54 actuated by these gates will be closed. This switch closes the circuit through solenoid valve 43a to energize the latter so that fluid can flow to the left end of cylinder 32a. The movement of the piston in the cylinder in response to fluid supplied to that end thereof will lower the carriers 25a so that billets carried thereby will be placed upon the conveying rolls 23a located beneath them. When the carrier 25a has reached its lowermost position, switch 55 will be closed to energize solenoid valve 35a, thereby permitting fluid to flow into the other end of cylinder 33a to close the gates 14. It will be seen that the sequence of operation set forth above is such that two billets are placed upon gates 14 and are then moved downwardly by the carriers 25a to be placed upon conveyor rolls 23a so that they can be moved simultaneously into the furnace.

While this has been taking place additional billets have been supplied to the rails 4 and are moving down these rails to a position above gate 12. When two more billets are above gate 12, or a total of four billets have passed member 48, this member is actuated to close its contacts 56 and 57. Closure of contacts 56 will energize solenoid 58 to open the switch 59 in the circuit of motor 9. Therefore, this motor will stop and no more billets will be delivered to the rail 4 until after the billets on gates 12 have been lowered to the conveyor rolls 23 to be supplied to the furnace. If switch 47 is closed indicating that no billets are on the conveyor rolls beneath gates 12, then the closure of switch 57 will energize solenoid valve 42 to open the same so that fluid can flow to the right end of cylinder 32. This causes movement of carriers 25 upwardly so that they lift the two billets then on gate 12 slightly above these gates. When carriers 25 have reached the limit of their travel, switch 61 will be closed to energize solenoid valve 34. This permits fluid to flow to the left end of cylinder 33, thereby producing an opening movement of the gates 12. When the gates have opened to the position shown in Figure 1, a switch 62 operated thereby will be closed to cause energization of solenoid valve 43. As this valve is energized it is opened so that fluid can flow to the left of cylinder 32 thereby lowering the carriers 25 to place the billets on these carriers on conveyor rolls 23 beneath the gates 12. When the carriers have reached their lowermost position, switches 63 and 64 operated thereby are closed. Closure of switch 63 energizes solenoid valve 35 to open the same so that fluid can flow into the right end of cylinder 33. This produces a movement of connecting rod 18 to close the gates 12 in preparation for the reception of additional billets. Closure of switch 64 energizes solenoid valve 39 to open the same so that fluid can flow into the upper end of cylinder 38. As the upper end of cylinder 38 fills with fluid, stop 13 is moved to its inoperative position, thereby permitting billets that have been placed on rail 4 to roll down on top of gates 14. When the stops are completely out of the way a switch 65 operated thereby will be closed. Closure of this switch energizes solenoid 66 for switch 59 to close the latter switch. As switch 59 is closed the conveyor chain motor 9 is started to rotate again so that additional billets will be placed upon the rails 4 to repeat the operation.

From the above it will be seen that there is an automatic sequence of operation which places two billets in turn upon the gates 14 and 12. These billets are then lowered into a position where they are on the conveyor rolls leading to the furnaces. Therefore, pairs of billets are supplied one after the other to the furnaces. The system is so set up that there is always a reserve supply of billets on the gates ready to be lowered into position for feeding to the furnaces as soon as the billets that were previously supplied to the furnaces have moved out of the range of the loading table.

Figures 2, 4:
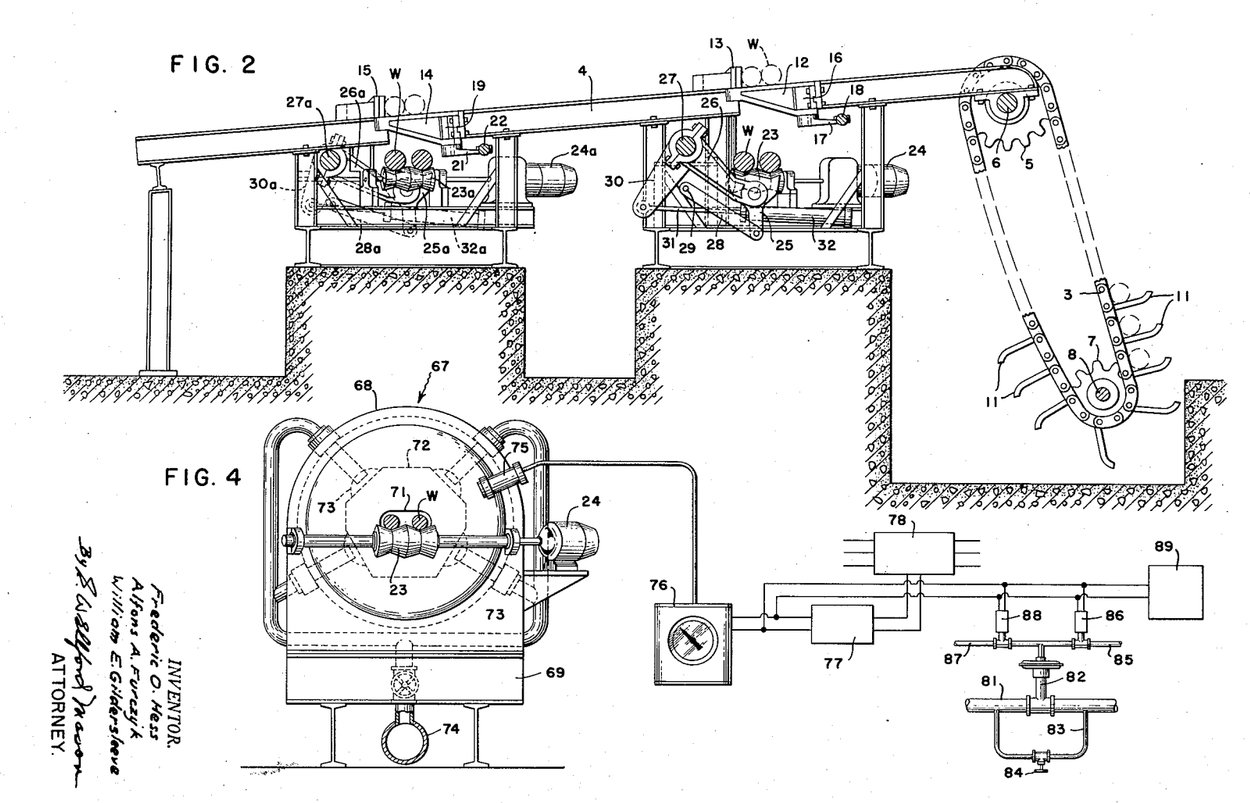
Figure 2 is a view from the left end of Figure 1 showing an elevation of the supply mechanism.
Figure 4 is a view taken on line 4—4 of Figure 1A showing an end view of one of the furnace units and some control mechanism used therewith.

Each of the furnaces in the heating section B comprises a number of furnace units 67 that may be of the type shown in Hess application Serial Number 602,323 filed June 29, 1945, now Patent No. 2,529,690 issued November 14, 1950. These furnace units are each shorter than the billets that are being heated and have between them individual drive rolls 23 that are driven by motors 24 and form a continuation of the conveying line that was used to move the billets from the supply section into the furnace. The number of furnace units that is used in each of the furnaces will vary depending upon a number of things. For example, the greater capacity the system is to have or the larger the billets that are to be heated the larger number of furnace units that will be required. In any event, enough furnace units are used in each of the furnaces in order to bring the billets up to the desired piercing temperature in the neighborhood of 2250° F. Each furnace unit as shown in Figures 1 and 4 has a pair of heads 68 that are mounted on a framework 69. The framework is of such a height that the billets are moved axially in a straight line through the furnaces from the supply section. Supported between the heads 68 is the body of the furnace unit which comprises refractory material that is sheathed in sheet metal in accordance with ordinary furnace practice. Each head is provided with an opening 71 slightly larger than the two billets that are being heated, which opening leads to a substantially cylindrical furnace chamber 72. The furnaces are heated by burners 73 of any suitable design and capacity. These burners as shown herein, however, are preferably of the type disclosed in Furczyk application Serial Number 56,616, filed October 26, 1948, now Patent No. 2,561,793 issued July 24, 1951. The burners are supplied through a fuel line 74 and may be supplied either with a combustible mixture through a single line or if desired can be supplied separately by air and gas or oil lines, depending upon the exact construction of the burner. In any event it is convenient to have the fuel lines as shown at 74 extending beneath the framework for the length of the furnace with pipes leading from said fuel line or lines to the burners of each furnace unit.

In the operation of the furnaces, each furnace unit is fired individually so that as the billets move through the furnace units they are progressively and continuously elevated in temperature until by the time that they leave the last furnace unit of the heating section they will be at the desired temperature. Suitable controls of a type well-known in industry may be used to control the temperature of the furnace units and thereby the temperature to which the billets are raised. The particular type of controls forms no part of the present invention. It is sufficient that the controls be of any necessary or desired type so that the temperature of the furnace units is maintained at a value to insure the exit temperature of the billets being that desired. It is noted that the axes of the conveyor rolls 23 and 23a are at an angle to the axes of the furnaces. This construction causes the billets to rotate as they are being moved through the furnaces, thus insuring even heating over the entire surface, as well as from end to end.

From time to time it may be that one or more billets is not heated sufficiently for the process with which the billets are to be used. Means is provided to insure that the billets are always brought up to the desired temperature. This means includes a radiation pyrometer 75 that is located beyond the last unit of each furnace. These pyrometers are sighted on the billets as they emerge from the last furnace unit and respond to billet temperature. If for any reason the billets having not been brought up to the proper temperature, the response of this pyrometer and a control instrument 76 connected therewith will act to reverse all of the conveying roll motors 24 so that the billets will be held in the furnace for a longer period of time. To this end the conventional control contacts in a potentiometer type of instrument 76 are used to actuate a timer 77 which will throw the switch in a reversing mechanism 78. Therefore, if the billets are not up to temperature, all of the motors of a given furnace line will be reversed at a low speed for a predetermined time depending upon the setting of the timer 77. When this time is up the motors 24 will automatically be energized to move the billets in their forward direction. Generally the reversing mechanism 78 is so adjusted that the motors will be driven slowly in a reverse direction and at some faster predetermined line speed when the billets are being forwarded normally through the system.

In case the billets are too hot or in case of some other emergency, means is provided to reduce the fuel supply to all of the furnace units of a given furnace line in response to the measurement made by the pyrometer 75. As is best shown in Figure 4, the main supply pipe for each furnace line is indicated at 81. This supply pipe has in it a pneumatically operated valve of the normally closed type which valve is maintained open by pressure applied to the upper surface of its diaphragm. Around the valve is a by-pass line 83 having a valve 84 in it so that when the fuel supply is reduced, some predetermined minimum amount will always be fed to the burners. Air under suitable pressure is supplied through a pipe 85 and the normally open solenoid valve 86 to the diaphragm of valve 82. An exhaust line from this valve is indicated at 87 and has in it a normally closed valve 88. If the temperature of the billets emerging from the furnace is too high, limit switch in the instrument 76 will be thrown to energize valves 86 and 88. When this occurs valve 86 will be closed to cut off the supply of air and valve 88 will be open so that air applied to the diaphragm of valve 82 can bleed to the atmosphere, thereby permitting valve 82 to close and shut off the supply of fuel to the furnace until the emergency is over. Means is also provided in the form of a manually operated push button station 89 which will permit manual operation of valves 86 and 88 to reduce the supply of fuel to the furnace if for some reason the operator finds this is necessary.

Figure 5:
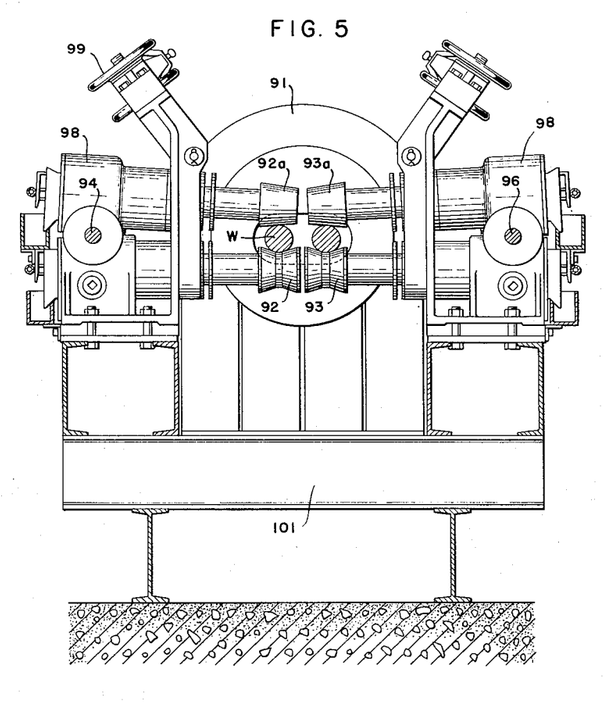
Figure 5 is a view taken on line 5—5 of Figure 1B showing an end view of one of the holding furnace units and the pinch roll mechanism.

Following the heating section B is the holding section C of the system. This section serves the purpose of receiving the heated billets from the elongated furnaces and holding them at temperature during the time they are advanced in sequence to a cutting mechanism for cutting them to the proper lengths and discharging them, in this case, to a piercing mill. Since the holding section has only the function of holding the billets at temperature rather than heating them, the furnace units of this section can be smaller than the furnace units 67. It is intended that there shall be four or more furnace units 91 in each of the holding sections and that they shall be fired from the top by two burners similar to those used in the furnaces 67. Between each of the last four holding furnace units and beyond the last one there are provided pairs of pinch rolls 92 and 93 (Figure 5). Each of these pinch rolls is positioned to receive a single billet as it is forwarded to the holding section by the conveyor rollers 23. The separate sets of pinch rollers on each side of the holding section are driven together. It will be seen that the pinch rollers 92 are driven by a shaft 94 from a motor 95. This motor, as will be explained below, is a variable speed motor that can be run in either direction. In a like manner pinch rollers 93 are driven by a common shaft 96 from a similar motor 97. Referring to Figure 5, it will be seen that each of the sets of pinch rollers consists of a lower conveyor roller 92 or 93, and an upper roller 92a or 93a which serves to hold the billet in engagement with the surface of the conveyor roller. Suitable gearing 98 is provided between the shafts 94 and 96 and the respective pinch rollers. Adjustment means 99 is also provided to vary the force with which the rollers 93 and 93a or 92 and 92a grab the billet as it is being forwarded by these rollers from the heating section to the discharge section. It is noted that the furnace units 91 and the pinch rollers are mounted on a suitable supporting framework 101 so that the pinch rollers and the openings in the furnace units are in axial alignment with the furnace units 67.

As was mentioned above the billets are removed one at a time from the holding section and in sequence from the two furnace lines a distance determined by the length of the billet which is to be supplied to the piercing mill. The billets are withdrawn from the holding section at a speed higher than the normal line speed of the heating furnace, clamped and cut by a hot saw 102 or 103, depending upon whether it is the furnace line 1 or 2. The use of a saw for cutting the billets after they have been heated insures that the end of the billet presented to the piercing mill will be clean and free from scale. The section of the billet that has been cut off is discharged to a conveyor which carries it to the piercing mill. The section of the billet remaining in the holding furnace is returned to that furnace so that the end of the billet is maintained at temperature until such time as it is again brought forward to be cut. The discharge mechanism will now be described.

Figure 6:
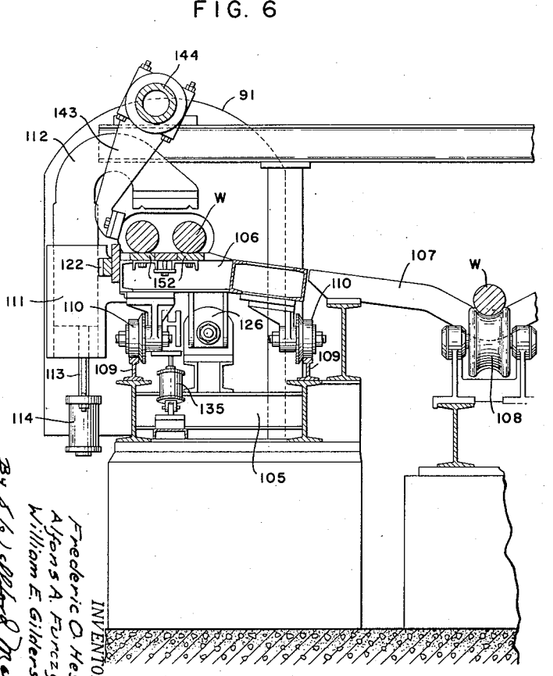
Figure 6 is a view taken on line 6—6 of Figures 1B and 7.
Figure 7:
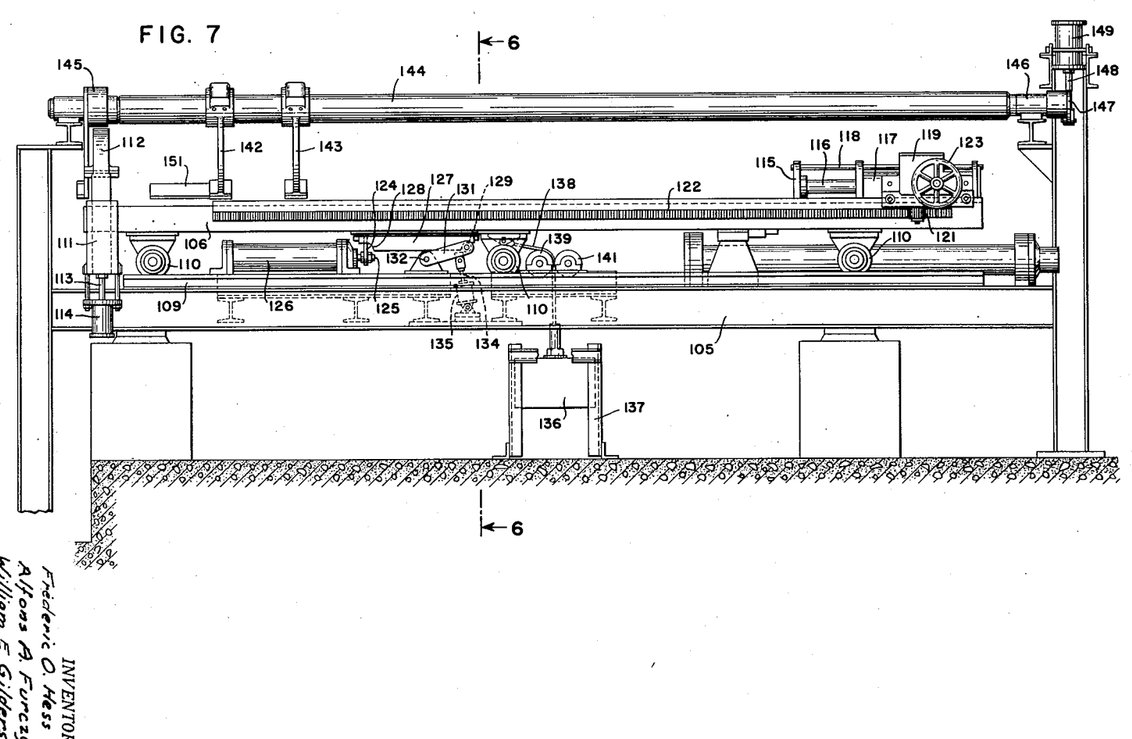
Figure 7 is a side view of one of the discharge tables and the mechanism associated therewith.

The discharge section as best shown in Figures 1, 6, and 7 includes a frame 105 upon which are mounted a pair of discharge tables 106 and 106a that are aligned with the furnace lines 2 and 1 respectively. Between the two discharge tables there are provided a series of skids or rails 107 down which the cut billets roll to be received by a single conveyor 108 that feeds the cut billets to the piercer E.

Each of the discharge tables and its operating mechanism is identical, therefore, a description of one will be sufficient. The description will be made of the discharge table 106 which is located in axial alignment with the exit opening of the holding furnaces for the line 2 and immediately beyond saw 103. Frame 105 is provided with a pair of rails 109 on which are received wheels 110 that support the table for movement a limited amount along the rails. The discharge table is provided near its left end in the drawing with a guide 111 that receives a clamp 112 which is used to clamp the billets during the time that they are being cut by the saw 103. This clamp is mounted in the guide 111 for vertical movement and is actuated by a piston on the lower end of a piston rod 113, which piston is received in a hydraulic cylinder 114.

As was noted above, the billets may be cut to various lengths depending upon the size tube that is being made and upon various other factors determined by the production schedule of the mill in which the entire system is located. The length of the billet cut is determined by a stop 115 which the billet strikes when it is moved a sufficient distance from the furnace. This stop is mounted on the end of a piston rod 116, the piston of which is received in an air cylinder 117. Also movable with the stop is a switch actuating rod 118, which actuates switches located in a housing 119 that is mounted on top of the cylinder. The actuation of these switches will be described in detail below. In order to vary the length of the billet that is to be cut, the stop and its associated mechanism may be moved lengthwise along the table to various positions. To this end the cylinder and the parts carried thereby are mounted on suitable guides. Rotatably mounted in the cylinder casting is a pinion 121 that meshes with a rack 122 attached to the side of the discharge table. Rotation of a hand wheel 123 will cause the pinion to move along the rack and thereby position the stop and cylinder at various distances from the exit of the holding furnace.

After the cutting of the billet has taken place the table is moved to the right in Figure 7 in order to move the end of the billet away from the saw and upstanding portions of the frame 105 prior to the time that the billet is ejected from the table to the conveyor 108. The table is moved along the tracks by pneumatic action. The moving means includes a bracket 124 that is attached to the lower surface of the table and which has a piston rod 125 fastened to its lower end. This rod has a piston on its end that is received in a cylinder 126 which in turn is fastened rigidly to the frame 105. The table may be held in either its retracted position as shown, or its extended position by cooperation between a stop plate 127 fastened to its lower surface and a suitable lock. This plate has notches 128 formed in its ends as best shown in Figure 7, which notches are adapted to receive a detent 129 that is mounted on the end of a lever 131 pivoted at 132 to the frame. The detent and lever are biased in a counter-clockwise direction by any suitable means, such as a spring, and are moved in a clockwise direction to move the detent out of the notch 128 by a piston, one end of which is fastened to a rod 134 that is pivoted to lever 131 and the other end of which is received in a cylinder 135 pivotally mounted upon the frame. The acceleration and deceleration of the table both as it is being moved away from and toward the saws by the action of cylinder 126 is assisted by a counterweight 136 which is guided in suitable guides 137. This counterweight is attached to the lower portion of the table by a chain 138 which passes over either guide roller 139 or guide roller 141.

After the table has been moved to the right in Figure 7 of the drawing so that the billet has been carried away from the saw sufficiently for it to be ejected, the billet is moved off the table, and rolls down the skids 107 to the conveyor 108. The billet is moved from the table by a pair of kick-off members 142 and 143 that are attached to a shaft 144, which shaft extends the full length of the frame 105. Shaft 144 is mounted for oscillation on the frame in bearings 145 and 146. This shaft is moved in a counter-clockwise direction in Figure 6 in order to eject the billet from the table by hydraulic action. Such action is secured by a lever 147 that is attached at one end to the shaft and at its other end to the lower end of a piston rod 148 which has a piston received in a cylinder 149.

During the time that the system is in operation it is customary to make a run with billets of a given length for a considerable period of time. Therefore, after the stop 115 has been adjusted for a given run it may be locked in place during the time that the run is being completed. Since the cut billets may be of different lengths, the kick-off member 143 may be adjusted along shaft 144 to various positions so that the kick-off members 142 and 143 will engage the cut billets at positions adjacent to their ends and thus insure that the billets are moved in a parallel direction toward the conveyor. It is noted that the kick-off member 142 has an extension 151 attached to it which is intended to engage substantially the full length of the shortest pieces that are cut.

When the billets are so short that member 151 is all that is needed to move them from the table, the kick-off member 143 can be moved so that it will not interfere with the action of the stop that at that time will be locked near the left end of the table as shown in the drawing. It is also noted that the table is provided with hardened wear plates 152 over which the billets slide as they are moved on to the table and against which they are held by the clamp 112 during the time that the cutting takes place.

The various elements of the discharge mechanism are disclosed herein as being fluid operated. Accordingly, suitable fluid inlets are provided for the various actuating cylinders. These inlets are disclosed as being controlled by electrically operated valves. Suitable, and well-known, means can be used to regulate the exhaust of actuating fluid from one end of a cylinder when fluid under pressure is being supplied to the other.

In the operation of the system, billets are supplied two at a time to each furnace line. They are withdrawn from the holding section to be cut one at a time from alternate lines. The cut end is ejected to the conveyor leading to the piercing mill, or other point of use, and the remainder of the billet is retracted into the holding section to be kept at temperature until it is needed. The timing of the operation depends upon the number of pieces per minute needed for the mill, and is determined by the operator. To this end, there is provided a timer 153 (shown diagrammatically in Figure 8) which periodically initiates the ejecting operations. As this timer is adjusted to vary the number of cuts made per minute the line speed of the furnace conveyors is preferably also adjusted automatically so that the system can be operated without interruption or jamming.

Normally the billets are moved by the conveying mechanism through both the heating and holding sections of the furnaces at a predetermined line speed. When an impulse from the timer calls for one of the billets to be cut it moves forward at line speed until it projects from the end of the last holding furnace unit. At that time a beam of light directed across the path of the billet is cut off, thus de-energizing a photoelectric cell 154 and a relay 155 actuated thereby. The billet is then moved forward the desired distance at high speed, cut and returned to the furnace unit. The billet continues in its reverse direction until the timer again calls for that billet to be cut. Because of the type of operation that is performed, each of the pinch roll motors 95, 95a, 97 and 97a must be capable of being operated in both directions are various speeds.

Figure 8:
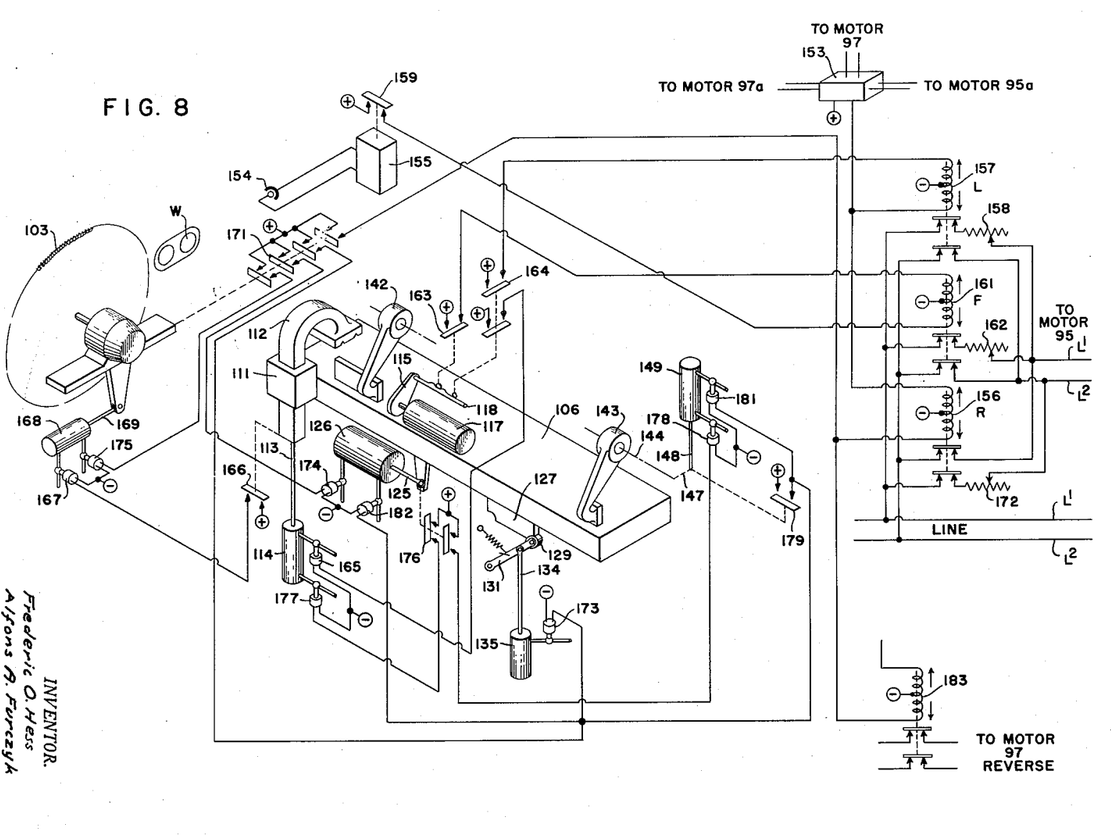
Figure 8 is a perspective view of one of the discharge mechanisms and the operating mechanism associated therewith.

Referring now to Figure 8, the sequence of operation and the actuating means therefor will be described. Assume that the system is operating normally and that the billet moved by the pinch rolls driven by motor 95 is being moved slowly in a reverse direction. An impulse by timer 153 calling for that billet to be cut next will energize the upper coil of a relay 156 to stop the reverse movement of motor 95 and will energize the lower coil of a relay 157 to cause forward movement of the motor and billet at a speed determined by the setting of a resistance 158, which is usually line speed. The billet then moves forward until it cuts off the light beam on photoelectric cell 154, thus de-energizing relay 155. This causes the relay to drop closing a switch 159 to energize the lower coil of a relay 161 to close a switch operated thereby. This switch supplies power to the motor 95 through a resistance 162 that is less than resistance 158, so that the billet, the end of which is now out of the furnace, can move forward at high speed.

The billet continues forward at high speed until it strikes stop 115, about one foot before it has moved the desired distance. The piston attached to the stop acts against a cushion of air in cylinder 117 to help slow down the billet, and rod 118 actuates in sequence a pair of switches. The first switch 163 is closed immediately to energize the upper coil of relay 161 and slow down motor 95. When the billet has moved the exact distance desired, a second switch 164 is closed. This switch has two functions: first, to energize the upper coil of relay 157 and open the circuit to motor 95; and second, to close a circuit energizing a solenoid valve 165 controlling the flow of fluid to the upper end of cylinder 114. Clamp 112 is then moved downwardly to hold the billet securely on the discharge table 106.

Movement of the clamp closes a switch 166 to cause energization of a solenoid valve 167 so that fluid can flow into one end of a cylinder 168. This cylinder has a piston in it on the end of which is a piston rod 169 that is connected by suitable linkage to the supporting table for saw 103. As fluid flows into the cylinder the saw will be moved inwardly to cut the billet. When the saw completes its cutting stroke a switch 171 that closes four circuits is moved to its closed position. The first circuit closed by switch 171 energizes the lower coil of relay 156 to energize motor 95 for rotation in a reverse direction at a speed determined by the setting of a resistance 172. The uncut end of the billet is then drawn back into the holding section of the furnace and continues in the reverse direction until it is again time for another cut to be made on this billet. The second circuit energizes a solenoid valve 173 to permit fluid to flow in the upper end of cylinder 135 and move piston rod 134 downwardly to move roller 129 out of the notch in plate 127. This frees the discharge table for movement. The third circuit energizes a solenoid valve 174 to permit fluid to flow into the left end of cylinder 126 and thereby move the holding table so that the cut length of billet will be cleared from the structure of the supporting frame adjacent to the saw. The fourth circuit energizes a solenoid valve 175 thus permitting fluid to flow into the other end of cylinder 168 to retract the saw.

As the table 106 carrying the cut end of the billet reaches the end of its travel a switch 176 is closed. This switch closes two circuits, the first of which energizes a solenoid valve 177 to permit fluid to flow into the lower end of cylinder 114 to release clamp 112 from the billet. Simultaneously the second circuit energizes a solenoid valve 178 to permit fluid to flow into the lower end of cylinder 149 to actuate the kick-off members, and move the billet to conveyor 108. As the kick-off members are actuated a switch 179, that performs three functions is closed. This switch closes a circuit for a solenoid valve 181 to open the same so that fluid can be admitted to the upper end of cylinder 149 and return the kick-off members to retracted position. A circuit for valve 173 is also closed to release latch member 129 from the other end of plate 127, and a circuit is closed to energize a solenoid valve 182. As this latter valve is opened fluid will flow to the right end of cylinder 126 to move table 106 back to its normal, retracted position. The various parts are now in position waiting for another cutting operation to take place.

It is noted that the cutting movement of the saw 103 which closes switch 171 to energize the lower coil of relay 156 also energizes the lower coil of a relay 183 that controls the reversal of pinch roll motor 97. Since, however, this latter motor is already rotating in a reverse direction as a result of the previous cutting operation on the billet controlled thereby, the additional energization of relay 183 has no effect.

The other discharge table 106a, at the end of furnace line 1 is constructed and operates in a manner identical to that just described. The only difference in the two tables is that they are the reverse of each other since both of them must move the cut lengths of the billets toward the center where they will fall upon conveyor 108.

The timer 153 is of any commercially available type that can be made to operate four circuits in sequence with predetermined intervals of time between each operation. In the intended operation of the system each of the pinch roll motors is connected to be operated in a manner similar to that described. The sequence of operation of the timer is such that motor 97a will be operated to start an ejecting and cutting cycle. A predetermined time later motor 97 will be operated. This is followed by the operation of motor 95a, and then motor 95. Thus the billets are removed in sequence from alternate furnace lines. If for some reason one of the furnace lines is shut down the timer can be adjusted to supply alternate billets from the same line. In such a case the time interval between each cutting and ejecting operation would of necessity be longer to allow time for the discharge table to be returned between operations. The sequence of operation of the entire system has been described as being fully automatic, and this is the way in which it will normally operate. It will be obvious, however, that push buttons can be inserted in the system so that the various elements can be operated manually, if desired. Manual operation may be desirable for testing purposes or when starting the system up.

The operation of the loading section of the system is such that fresh billets are supplied to the conveyors to be moved through the furnace lines one after the other in a substantially continuous stream. Since the billets are advanced rapidly to be cut and returned to the holding section slowly, and since each billet when it is returned is shorter than when it was advanced for cutting, there will be no interference between the trailing end of one billet and the leading end of the next in a given position in the lines.

In an installation of a system of the type described that is designed to heat between 35 and 40 tons of billets per hour there are nineteen heating units and eight holding units in each furnace line. The pinch rolls are located between the last four holding units, and at the end of the line. The billets move through the furnace at a line speed of from two and a half to twelve feet per minute depending upon their size, and the number of cuts per minute that are to be made are from one cut every three minutes to six cuts per minute, depending upon the diameter of the billet, and the length of the cut section. As the billets travel through the furnace their temperature is raised from ambient to 2250° F., and at an average speed of nine feet per minute; this takes six and one half minutes. The temperature of each furnace unit in the heating section is maintained at substantially 2600° F.

The length of the billets that may be heated must be sufficient so that each billet is at all times supported on at least two of the conveying rollers. The system can handle billets as short as nine feet in length, although the average length of billets heated will be from thirty-six to forty feet long. The stops on the holding tables may be adjusted so that the billets may be cut into lengths of from three to sixteen feet. When the shorter lengths are being cut there can be as many as six cutting cycles per minute, but with longer lengths each cycle will take as long as a minute and a half.

In all cases the speed of operation will depend somewhat on the size of the billet being heated. In one installation the system was designed to handle billets for piercing ranging from three and one quarter to five inches in diameter.

The operation of the system on a whole should be apparent from the above description. A summary of the operation will, however, be given. Billets that have preferably been precut to a length that is an even multiple of the lengths to be produced for a given run are supplied to a position where they can be picked up by the elevating chains 3. As the billets roll down the rails 4 they are stopped in pairs over the respective series of gates 12 or 14. The billets previously deposited on these gates having been lowered, the new billets thereon will be lowered to the conveying rollers 23 and moved into the furnaces to be heated. The lowering operation requires only a very short period of time so that the rows of billets moving through the furnaces form substantially a continuous stream.

As the billets move through the furnace they are rapidly brought up to temperature. The temperature of the furnaces is controlled by suitable instruments and the temperature of the billets is measured directly. Means is provided to insure that each billet is heated individually to the correct temperature prior to the time it is forwarded to the discharge table. At the discharge tables the billets are removed from the furnaces one at a time, cut to the desired length and supplied in a single line to the point of use.

Thus it will be seen that there is provided a fully automatic system for taking work pieces from a stock pile, dividing them into a plurality of lines to be heated, heating them, removing them one at a time from the heating devices, and supplying the heated work pieces in a single line to a point of use. The workpieces are handled with a minimum of manual labor and operator attention. They are heated so rapidly that they are substantially scale free, and are passed directly to the point of use at the temperature and in the lengths necessary for any particular operation that is to be performed on them. An important feature of the system is that each billet is treated in exactly the same fashion. Thus the uniformly treated billets will produce uniform products. The importance of this feature should not be underestimated.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention, as set forth in the appended claims, and that in some cases certain features of my invention may be used to advantage without a corresponding use of other features.

What is claimed is:

1. In a system for heating billets and the like, the combination of an elongated furnace, means to supply a plurality of rows of billets one after the other in end-to-end relation to said furnace, conveyor means to move the billets through the furnace, drive means individual to each row of billets to operate said conveyor means adjacent to the exit end of said furnace, means to operate one of said drive means to remove a billet from one row at high speed for a predetermined distance beyond the end of said furnace, means to operate said drive means to return said billet to the furnace and to operate another drive means to forward a billet from the row controlled thereby from said furnace, means to operate said drive means to return said last-mentioned billet to said furnace, and means controlled in response to outward movement of the billets from the furnace to perform work upon them.

2. In a system for heating billets, the combination of a pair of parallel elongated furnaces, means to supply a plurality of rows of billets one after the other in end-to-end relation to each furnace, individual means to forward billets of each row from said furnaces, a cutting device adjacent to the end of each furnace, a delivery table adjacent to each cutting means and positioned to receive billets discharged from the respective furnaces, a clamp on each of said tables, means to operate the forwarding means for one row of billets, means operated when a billet has been advanced on a table a predetermined distance to operate the clamp on said table and the cutting means therefor to cut off the extending portion of the billet, means responsive to the completion of the cutting operation to release said clamp and actuate said forwarding means to return the uncut length of the billet to the furnace, and means to operate each forwarding means in sequence whereby the billets in each row will be advanced, cut off and returned to the furnace from which it was removed.

3. In a system for heating billets and the like, the combination of an elongated furnace, a conveyor to move a stream of billets one after the other lengthwise through said furnace, drive means to drive a portion of said conveyor near the exit of said furnace, cutting means to sever the billets into predetermined lengths as they issue from said furnace, a delivery table to receive the billets, clamping means on said table, means responsive to the issuance of a billet a predetermined length from said furnace to stop said drive means and operate said clamp, means responsive to the actuation of said clamp to operate said saw, means responsive to the operation of said saw to reverse said drive means to move the remainder of the billet back into the furnace where it can be maintained at temperature until another cutting operation is to take place, and means operative to release said clamp and remove the cut length of billet from said discharge table.

4. In a system for heating billets and the like, the combination of an elongated furnace, means to feed billets one after the other lengthwise into said furnace, a conveyor to carry the billets through said furnace, reversible drive means for said conveyor, a temperature responsive device located to respond to the temperature of said billets as they pass a given point in said furnace, mechanism operated by said responsive means to reverse the direction of said drive means upon the passage of a billet below a predetermined temperature past said responsive means, and means operative after a predetermined time interval to cause said drive means to run again in its original direction thereby to increase the time the billet is in said furnace so that it may be heated to the proper temperature.

5. In a system for heating elongated articles, the combination of an elongated furnace, conveyor means to move articles one after the other through said furnace, reversible drive means for said conveyor means, a temperature responsive device operative to respond to the temperature of said articles at one point as they move through said furnace, mechanism operated by said temperature responsive means upon the response thereof to an article below a given predetermined temperature to reverse said drive means, and a timer operative to control the time said drive means is reversed.

6. In a system for heating elongated articles, the combination of a pair of parallel elongated furnaces, means to deliver articles alternately to said furnaces, separate conveyor means each having a first portion and a last portion to move the articles continuously through said furnaces, means to drive said first portions at a substantially constant speed, variable speed drive means for said last portions, separate discharge tables for each furnace upon which said articles are delivered, control means operative to control said variable speed drive means to increase the speed thereof alternately whereby an article will be delivered to first one delivery table then the other, means to move articles from said delivery tables to a common position, and means to move said articles in a single line from said common position to a point of use.

7. In a system for heating elongated articles, the combination of a pair of parallel elongated furnaces, means having a first portion and a last portion to forward a row of articles to be heated through each of said furnaces, separate discharge means to receive said articles as they leave said furnaces, control means operative to control the last portion of each of said moving means to speed said portions up alternately thereby to bring an article from first one then the other of said furnaces to said delivery means, and means to move said articles from said delivery means to a position from which they can be taken for further treatment.

8. In a system for heating elongated articles, the combination of means to supply articles from a source, distributing mechanism to receive said articles from said means and separate them into a plurality of groups, conveying means for forwarding each of said groups through a predetermined path, heating means located along said path to heat said articles as they are being moved, discharge means to receive said articles from said conveying means after they have been heated, and means to control the operation of said discharge means to take articles from said groups in sequence, said discharge means including mechanism operable to deliver the articles to a given point, and means to forward the articles from said point to a place of use.

9. In a system for heating elongated billets and the like, the combination of an elongated furnace, means to supply one after the other in end-to-end relation a plurality of rows of billets to said furnace, a discharge table positioned adjacent to the exit end of said furnace upon which billets are discharged, means to forward billets from each of said rows through said furnace to said discharge table, means to operate said discharge table to move it from said position so that billets can be moved therefrom to a point of use, means to control said forwarding means to move billets alternately from said rows of billets to said discharge table, means operated by a billet as it moves from a furnace to clamp the billet on said discharge table while work is performed thereon, and means operated upon completion of the work to release said clamp and move the billet from the discharge table.

10. In a system for heating billets and the like, the combination of a pair of parallel, elongated furnaces, means to supply billets in end-to-end relation one after the other to each of said furnaces, a discharge table at the exit end of each furnace, means to forward billets through said furnaces to said discharge tables, a common conveyor to receive billets from said discharge tables, means to control the operation of said forwarding means to supply billets alternately from said furnaces to said discharge tables, and means to move billets from said discharge tables alternately to said conveying means.

11. In a system for treating elongated billets and the like, means to supply billets in a plurality of rows one after the other in end-to-end relation, through a path cutting mechanism to cut said billets into predetermined lengths, conveying means to move the rows of billets through said path, individual drive means for said conveying means to move the billets of each row separately along said path and to said cutting means, a timer, means to actuate said cutting means, and mechanism operated by said timer to control the operation of said drive means whereby billets will be forwarded from each row to said cutting means alternately at equal intervals of time.

12. In a system for heating elongated articles, the combination of a pair of elongated furnaces, separate means to move articles to be heated through said furnaces, a loading table above said means to move, mechanism to place articles to be heated on said table, means to locate articles on said table above said means to move, means to lower articles from said table to said means to move, and means responsive to the passage of articles along said means to move into said furnaces to control the operation of said means to lower, whereby articles will not be lowered for movement into the furnaces if previously lowered articles are still on said means to move.

13. In a system for heating billets for piercing the combination of a pair of elongated furnaces located substantially parallel to each other, means to forward billets through said furnaces, means to receive hot billets from said furnaces, means to sever the hot billets into lengths as they are placed on said receiving means, means to return the uncut lengths of billets to the respective furnaces in which they were heated whereby they can be maintained at temperature, means to move the cut lengths of billets from the receiving means to a point of use, and means to operate said receiving means and cutting means to receive and cut billets alternately from the furnaces.

14. In a system for heating billets for piercing the combination of an elongated furnace, means to move billets through said furnace to heat the same, means to cut the heated billets into lengths as they issue from said furnace, means operated by said cutting means upon completion of a cutting operation to return the uncut length of billet to said furnace where it will be maintained at temperature, and means to forward the cut length of billet to a point of use.

15. In a furnace system, the combination of a furnace to heat elongated work, means to move work through and from said furnace, receiving means to receive hot work as it leaves said furnace, a measuring device on said receiving means engaged by the hot work to limit the length of work placed thereon, a clamp operated by said measuring device upon engagement thereof by the work to hold the work on said receiving means, means to sever the portion of the hot work on said receiving means from the portion of the work remaining in said furnace, and mechanism operated in response to completion of the severing operation to move said receiving means away from said furnace, release said clamp and move the work from said receiving means.

16. In a furnace system, the combination of a furnace in which work is heated, first conveyor means to move said work through said furnace, second conveyor means to move hot work from said furnace to a point of use, means located between said furnace and said second conveyor means including a supporting table, a measuring device on said table engaged by said work as it issues from said furnace to limit the movement thereof, a clamp on said table to hold said work in position thereon, mechanism operated by said measuring means when engaged by said work to actuate said clamp, means to sever the portion of the work on said table from that remaining in said furnace, means operated upon clamping of said work to actuate said severing means, and additional mechanism actuated in response to completion of severing the work by said severing means to move the table toward said second conveyor means, release said clamp, and move the severed portion of the work to said second conveyor means.

17. In a furnace system the combination of an elongated furnace to heat billets to piercing temperature, conveying means to move billets through said furnace endwise, means located adjacent to the exit of the furnace to work on the billets as they emerge from the furnace, means in the path of billet travel and engaged by the billets to determine the length of each section to be worked upon, clamp means operated upon engagement of a billet with said determining means to clamp the billet in position, while it is being worked upon and operates said working means, and means operated in response to said working on the billet to release said clamp means and forward the worked upon billet to a point of use.

18. The method of heating billets for piercing which comprises moving a plurality of billets endwise in side by side relation through a place of heating to bring them up to piercing temperature, removing alternately a portion of each billet from said place of heating, clamping said removed portion in a fixed position, and while it is fixed cutting the clamped portion from the billet, moving the remainder of the billet back into the place of heating, and conveying the cut off portion of billet to a point of use, and repeating the clamping, cutting and conveying operations in sequence on each billet and alternately on the plurality of billets.

References Cited in the file of this patent

UNITED STATES PATENTS

| Number | Name | Date |
|---|---|---|
| 1,782,692 | Lawson | Nov. 25, 1930 |
| 1,920,133 | Summey | July 25, 1933 |
| 1,980,368 | Bark et al. | Nov. 13, 1934 |
| 2,163,967 | Strawn et al. | June 27, 1939 |
| 2,287,833 | Ridgway | June 30, 1942 |
| 2,491,901 | Moohl | Dec. 20, 1949 |
| 2,589,576 | Rose | Mar. 18, 1952 |